T. BRADSHAW.
RESILIENT TIRE.
APPLICATION FILED APR. 28, 1917.

1,299,112.

Patented Apr. 1, 1919.

INVENTOR
THOMAS BRADSHAW
BY F. M. Wright
ATT'Y.

ns.

UNITED STATES PATENT OFFICE.

THOMAS BRADSHAW, OF OAKLAND, CALIFORNIA.

RESILIENT TIRE.

1,299,112. Specification of Letters Patent. Patented Apr. 1, 1919.

Application filed April 28, 1917. Serial No. 165,140.

*To all whom it may concern:*

Be it known that I, THOMAS BRADSHAW, a citizen of the United States, residing at Oakland, in the county of Alameda and State of California, have invented new and useful Improvements in Resilient Tires, of which the following is a specification.

The present invention relates to pneumatic tires of vehicle wheels, and has for its object to provide a tread on a pneumatic tire which will be durable, inexpensive, non-skidding, flexible to accommodate itself to distortions of the wheel tire while in service and supporting the load of the vehicle, not easily penetrated by sharp articles, and which increases the tractive property of the wheel tire.

Figure 1:
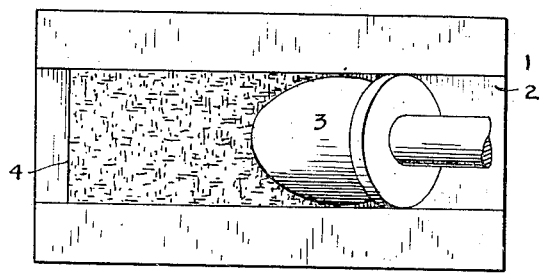
Figure 2:
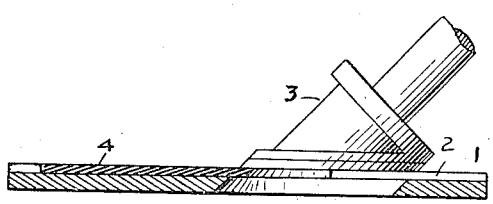
Figure 3:
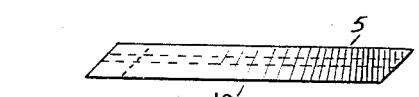
Figure 4:
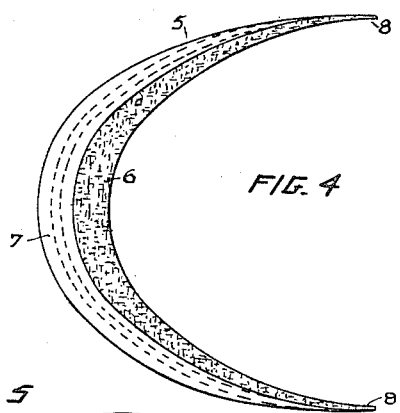
Figure 8:
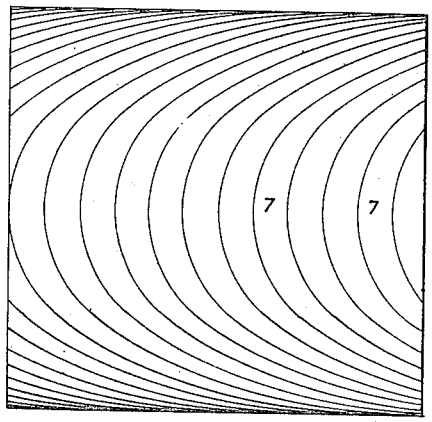
Figure 5:
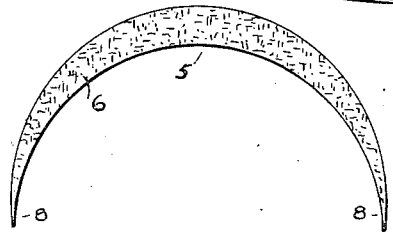
Figure 6:
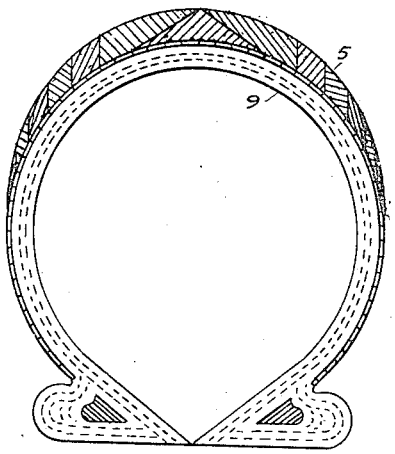
Figure 7:
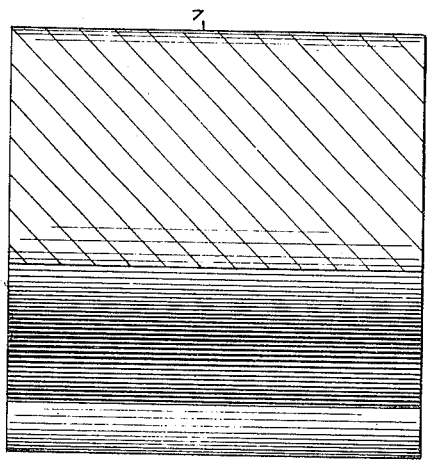

In the accompanying drawing, Figure 1 is a plan view of a guideway and die for cutting semi-elliptical strips; Fig. 2 is a longitudinal section of the same, the die being shown in side elevation; Fig. 3 is a side view of the strip so cut by said die; Fig. 4 is a plan view of the same; Fig. 5 is a view of the same observed at an angle of 45° from the view shown in Fig. 4; Fig. 6 is a cross section of the tire made up of my improved strips; Fig. 7 is a side view of a portion thereof; Fig. 8 is a plan view of said portion.

Referring to the drawing, 1 indicates a guideway having a groove 2, in which is fed to a die 3 a sheet 4 of fabric of substantially the width of the tread which is to be formed. The sheet of fabric may be a compound strip of fabric and rubber cemented together. This sheet is cut into strips 5 by means of the die 3, which, when operated to cut the strips, is moved at an angle of 45° to the sheet of fabric and also to the guideway. The strip so cut off from the sheet is shown in detail in Figs. 3, 4, and 5. It is of the general form of a prolate semi-ellipse, the inner and the outer edges of both its upper and lower surfaces being semi-elliptical in form, corresponding to the elliptical form of the die, which die is an oblique section of a cylinder whose axis is in a direction in which the die moves to cut off the strips. The upper surface 6 of the strip shown in Figs. 4, 5, is the part of the upper surface of the sheet which is severed after each advance of the sheet toward the die; the upper sloping surface 7 of the strip, seen in Fig. 4, but not in Fig. 5, is the part sheared off by the die in making its cut. The strip is of uniform height or thickness except that the ends are beveled throughout, as clearly seen in Fig. 3, but as shown in Fig. 4 it tapers to nothing in width at each end 8.

These strips are laid in succession on the tire 9 in planes making angles of 45° with the tangential direction of the tire, so that the surfaces 7 of all the strips form the outer surface of the tread of the tire, while the surfaces 6, which are parts of the original upper surface of the sheet of fabric, contact with the surfaces 10 of said strips which are parts of the original under surface of said sheet and are located within the body of the tread of the tire.

A wheel equipped with such a tread does not easily skid. The tread is very durable and it is also pliable and flexible, and can accommodate itself to the distortion of the wheel tire while in use, and greatly increases the tractive power of the tire.

I claim:—

A tread for a pneumatic tire composed of narrow strips, each of the general form of a prolate semi-ellipse and of flexible sheet material, arranged in contact with one another in planes oblique to the circumferential direction of the tread, their exposed outer surfaces being oblique to the planes of the respective strips and continuous with one another to form a smooth continuous tread surface.

THOMAS BRADSHAW.